United States Patent
Xiao et al.

(10) Patent No.: US 9,986,521 B1
(45) Date of Patent: *May 29, 2018

(54) SYSTEMS AND METHODS FOR DETECTING A PRIMARY SYNCHRONIZATION SIGNAL IN A WIRELESS COMMUNICATION SYSTEM

(71) Applicant: MARVELL INTERNATIONAL LTD., Hamilton (BM)

(72) Inventors: Chusong Xiao, Union City, CA (US); Qing Zhao, Milpitas, CA (US); Manyuan Shen, Milpitas, CA (US); Leilei Song, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/267,937

(22) Filed: Sep. 16, 2016

Related U.S. Application Data

(63) Continuation of application No. 14/022,739, filed on Sep. 10, 2013, now Pat. No. 9,451,569.

(60) Provisional application No. 61/702,499, filed on Sep. 18, 2012.

(51) Int. Cl.
*H04W 56/00* (2009.01)
*H04J 11/00* (2006.01)

(52) U.S. Cl.
CPC ....... *H04W 56/001* (2013.01); *H04J 11/0073* (2013.01); *H04J 11/0076* (2013.01)

(58) Field of Classification Search
CPC . H04W 56/001; H04J 11/0073; H04J 11/0076
See application file for complete search history.

(56) References Cited

U.S. PATENT DOCUMENTS

| | | | |
|---|---|---|---|
| 8,681,730 B2 | 3/2014 | Swarts et al. | |
| 2002/0094048 A1 | 7/2002 | Simmons et al. | |
| 2006/0193305 A1 | 8/2006 | Litwin et al. | |
| 2006/0233226 A1 | 10/2006 | Zhang | |
| 2009/0080547 A1* | 3/2009 | Naka | H04B 7/0604 375/260 |
| 2009/0147757 A1* | 6/2009 | Naka | H04W 88/02 375/260 |
| 2010/0061306 A1 | 3/2010 | Ryu et al. | |

(Continued)

*Primary Examiner* — Peter Chau

(57) ABSTRACT

Systems and methods are provided for detecting a received synchronization signal. The method includes receiving, at a receiver, a signal from a transmitter and the signal includes the received synchronization signal. The method includes processing the received signal and a plurality of candidate synchronization signals to obtain a plurality of correlation signals. Each candidate synchronization signal is associated with one of the plurality of correlation signals. The method includes selecting, based at least in part on the plurality of correlation signals, one of the plurality of candidate synchronization signals. The selected candidate synchronization signal is correlated with the received synchronization signal. The method includes detecting the received synchronization signal based at least in part on (i) the received signal, and (ii) a characteristic obtained from the correlation signal that is associated with the selected candidate synchronization signal.

18 Claims, 8 Drawing Sheets

(56) References Cited

U.S. PATENT DOCUMENTS

| | | | |
|---|---|---|---|
| 2010/0157884 A1* | 6/2010 | Haga | H04J 11/0069 |
| | | | 370/328 |
| 2010/0182979 A1* | 7/2010 | Malladi | H04J 11/0069 |
| | | | 370/336 |
| 2011/0007704 A1 | 1/2011 | Swarts et al. | |
| 2011/0026413 A1 | 2/2011 | Swarts et al. | |
| 2011/0026648 A1 | 2/2011 | Swarts et al. | |
| 2011/0134980 A1 | 6/2011 | Lipka et al. | |
| 2011/0243104 A1* | 10/2011 | Swarts | H04J 11/0073 |
| | | | 370/336 |
| 2011/0280176 A1 | 11/2011 | Lee et al. | |
| 2012/0093267 A1 | 4/2012 | Zhou et al. | |
| 2012/0100880 A1 | 4/2012 | Baek et al. | |
| 2012/0120999 A1 | 5/2012 | Kubo | |
| 2012/0307820 A1 | 12/2012 | Tomatis et al. | |
| 2013/0083877 A1 | 4/2013 | Gorokhov | |
| 2013/0258876 A1 | 10/2013 | Damji et al. | |
| 2013/0273912 A1 | 10/2013 | Xu et al. | |
| 2013/0321042 A1 | 12/2013 | Xu | |

\* cited by examiner

400

402
RECEIVE, AT A RECEIVER, A SIGNAL FROM A TRANSMITTER WHEREIN THE SIGNAL INCLUDES A RECEIVED SYNCHRONIZATION SIGNAL

404
PROCESS THE RECEIVED SIGNAL AND A PLURALITY OF CANDIDATE SYNCHRONIZATION SIGNALS TO OBTAIN A PLURALITY OF CORRELATION SIGNALS, WHEREIN EACH CANDIDATE SYNCHRONIZATION SIGNAL IS ASSOCIATED WITH ONE OF THE PLURALITY OF CORRELATION SIGNALS.

406
SELECT, BASED AT LEAST IN PART ON THE PLURALITY OF CORRELATION SIGNALS, ONE OF THE PLURALITY OF CANDIDATE SYNCHRONIZATION SIGNALS WHEREIN THE SELECTED CANDIDATE SYNCHRONIZATION SIGNAL IS CORRELATED WITH THE RECEIVED SYNCHRONIZATION SIGNAL.

408
DETECT THE RECEIVED SYNCHRONIZATION SIGNAL BASED AT LEAST IN PART ON THE RECEIVED SIGNAL AND A CHARACTERISTIC OBTAINED FROM THE CORRELATION SIGNAL THAT IS ASSOCIATED WITH THE SELECTED CANDIDATE SYNCHRONIZATION SIGNAL

FIG. 4

SYSTEMS AND METHODS FOR DETECTING A PRIMARY SYNCHRONIZATION SIGNAL IN A WIRELESS COMMUNICATION SYSTEM

CROSS REFERENCE TO RELATED APPLICATION

This application is a continuation of U.S. patent application Ser. No. 14/022,739, filed Sep. 10, 2013, which claims the benefit under 35 U.S.C. § 119(e) of U.S. Provisional Application No. 61/702,499, filed on Sep. 18, 2012, which are hereby incorporated by reference herein in their entireties.

FIELD OF USE

This disclosure relates to methods and systems for detecting synchronization signals associated with a communications protocol, such as the Long-Term Evolution ("LTE") protocol for mobile communications.

BACKGROUND OF THE INVENTION

Mobile communications protocols such as the 3GPP LTE protocol currently in use have a frame/half-frame/subframe structure. Included in that frame/half-frame/subframe structure are synchronization signals. It is important in decoding a mobile communications transmission to be able to identify the synchronization signals, which carry information regarding frame boundaries, cell identities, carrier frequency, etc.

A number of factors may increase the difficulty of identifying the synchronization signals. For example, synchronization signals are susceptible to low signal-to-noise ratios and fading environments (e.g., when a user is traveling through an area where wireless signals are weak, such as a tunnel) and are thus more difficult to identify under these conditions. Furthermore, identifying synchronization signals may involve computationally expensive and time consuming processes, which drains the battery life of a mobile device.

SUMMARY

In accordance with an embodiment of the disclosure, a method is provided for detecting a received synchronization signal. The method includes receiving, at a receiver, a signal from a transmitter and the signal includes the received synchronization signal. The method includes processing the received signal and a plurality of candidate synchronization signals to obtain a plurality of correlation signals. Each candidate synchronization signal is associated with one of the plurality of correlation signals. The method includes selecting, based at least in part on the plurality of correlation signals, one of the plurality of candidate synchronization signals. The selected candidate synchronization signal is correlated with the received synchronization signal. The method includes detecting the received synchronization signal based at least in part on (i) the received signal, and (ii) a characteristic obtained from the correlation signal that is associated with the selected candidate synchronization signal.

In accordance with an embodiment of the disclosure, a system is provided for detecting a received synchronization signal. A control circuitry receives, at a receiver, a signal from a transmitter and the signal includes the received synchronization signal. The control circuitry processes the received signal and a plurality of candidate synchronization signals to obtain a plurality of correlation signals. Each candidate synchronization signal is associated with one of the plurality of correlation signals. The control circuitry selects, based at least in part on the plurality of correlation signals, one of the plurality of candidate synchronization signals. The selected candidate synchronization signal is correlated with the received synchronization signal. The control circuitry detects the received synchronization signal based at least in part on (i) the received signal, and (ii) a characteristic obtained from the correlation signal that is associated with the selected candidate synchronization signal.

BRIEF DESCRIPTION OF THE DRAWINGS

Further features of the disclosure, its nature and various advantages, will be apparent upon consideration of the following detailed description, taken in conjunction with the accompanying drawings, in which:

FIG. 4 shows a flow diagram of a high level process for detecting a synchronization signal, in accordance with an embodiment of the present disclosure;

DETAILED DESCRIPTION

To provide an overall understanding of the disclosure, certain illustrative embodiments will now be described, including systems and methods for primary synchronization signal detection. However, the systems and methods described herein may be adapted and modified as is appropriate for the application being addressed and that the systems and methods described herein may be employed in other suitable applications, and that such other additions and modifications will not depart from the scope thereof.

Figure 1:
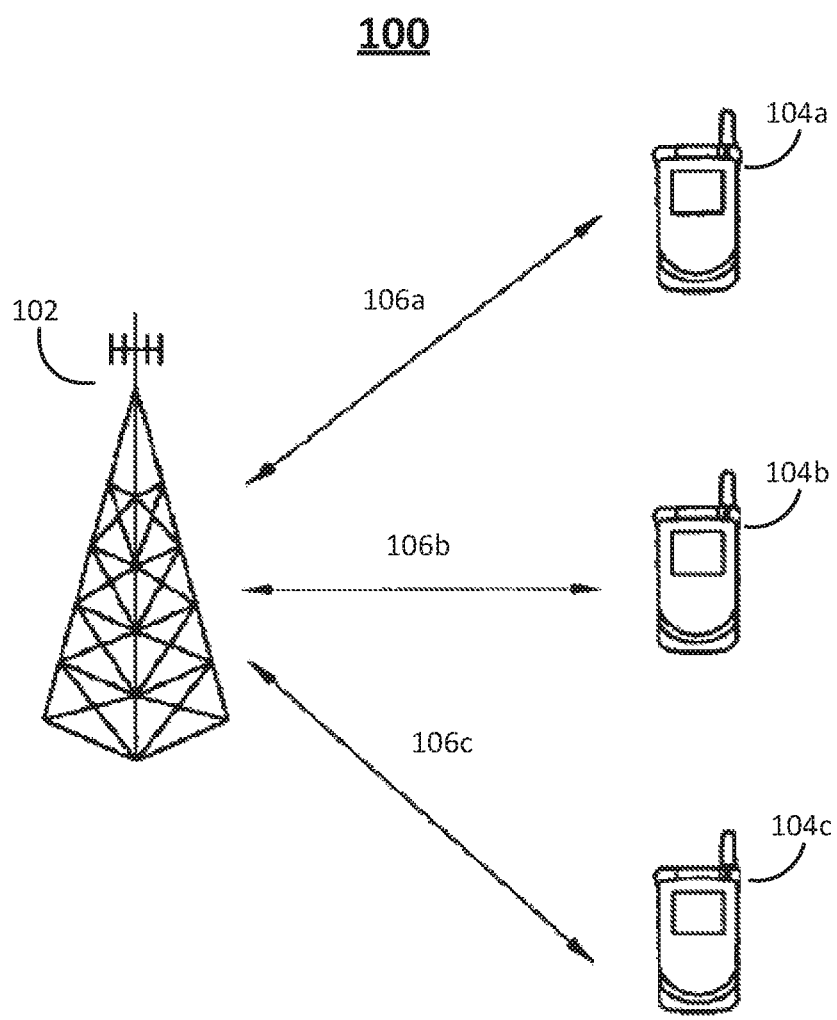
FIG. 1 shows a block diagram of an illustrative communications system, in accordance with an embodiment of the present disclosure.

FIG. 1 shows a simplified diagram of a wireless communications system 100 incorporating embodiments of the present disclosure. Communications system 100 may be a cellular communications system including a base station 102 and a plurality of user equipment devices 104a-104c (generally, user equipment 104). Base station 102 is configured to communicate with user equipment 104 within the radio communication range of base station 102 via radio signals 106a-106c (generally, radio signals 106). Within the 3GPP LTE standard, each base station is also known as an "eNB" for "enhanced Node B" or "evolved Node B". The radio communication range of base station 102 corresponds to a cell, which is a geographic area serviced by base station 102. Each cell or base station is often associated with unique network level identities, as well as a unique physical-layer cell identity (PCI) for data transmission over the cell.

Although shown as mobile handsets in FIG. 1, different embodiments of user equipment 104 may include mobile stations, user terminals, or any other suitable wireless device configured to be in communication with the base station 102, based on a communication standard such as the 3GPP LTE protocol.

At any one time, one or more user equipment devices 104 may be in communication with base station 102. Transmissions of data and other control or reference signals may occur in a downlink direction, from base station 102 to user equipment 104, or in an uplink direction, from user equipment 104 to base station 102.

The methods and systems described herein provide a technique for user equipment 104 to detect downlink synchronization signals transmitted by base station 102. User equipment 104 may acquire synchronization signals during initial network entry or cell re-selection, or for mobility measurement purposes. Base station 102 broadcasts synchronization signals corresponding to its PCI over its radio communication range. A user equipment wishing to access the wireless communication network follows a cell search procedure, during which a synchronization signal acquisition process determines the PCI of one or more cells in which the user equipment is located. The synchronization signal acquisition process may also determine time parameters (such as radio frame boundaries, for example) and frequency parameters (such as carrier frequency offsets, for example). The time parameters, the frequency parameters, or both may be used to sample and demodulate downlink signals, acquire critical system parameters, and to transmit uplink signals with correct timing information.

In some embodiments, system 100 operates according to an LTE protocol. In LTE, there are 504 unique PCIS, which are grouped into 168 physical-layer cell-identity groups, each group containing three unique identities. Specifically, $$PCI=3 \times NID1+NID2, \quad (1)$$

where NID1 ranges from 0 to 167 and represents the physical-layer cell-identity group, and where NID2 ranges from 0 to 2 and represents the physical-layer identity within the physical-layer cell-identity group. Each NID2 corresponds to a unique primary synchronization signal (PSS), while each NID1 corresponds to a unique pair of secondary synchronization signals (SSSs). Synchronization signals are transmitted in every radio frame, and are discussed in detail in relation to FIG. 2. PCIs may be reused within a cellular network for non-neighboring base stations.

During synchronization signal acquisition, user equipment 104 detects and identifies a PSS by processing signals received from one or more base stations. A SSS is subsequently detected and identified. The PCI of the corresponding base station is then determined, and used to locate cell-specific information within a radio frame. Such cell-specific information may include reference signals for channel estimation, control information for channel access and resource allocation, and other system parameters critical to successful data communication between base station 102 and user equipment 104. In addition, synchronization signal acquisition establishes radio frame timing boundaries and carrier frequency offsets.

In some embodiments, base station 102 and user equipment 104 in system 100 may be configured to use any of a variety of modulation and coding schemes to enable reliable communication. For example, a multiple access scheme may be used by system 100, such as code division multiple access (CDMA), time division multiple access (TDMA), frequency division multiple access (FDMA), single-carrier FDMA (SC-FDMA), orthogonal FDMA (OFDMA), or any other suitable modulation technique. These techniques demodulate signals received from multiple users of a communications system such as system 100 and increase the capacity of the communications system. Radio signals 106 of the downlink and uplink signals may be modulated using any suitable form of modulation scheme. For example, radio signals 106 may utilize quadrature amplitude modulation such as 4-QAN, 16-QAM, or 64-QAM modulation.

Figure 2:
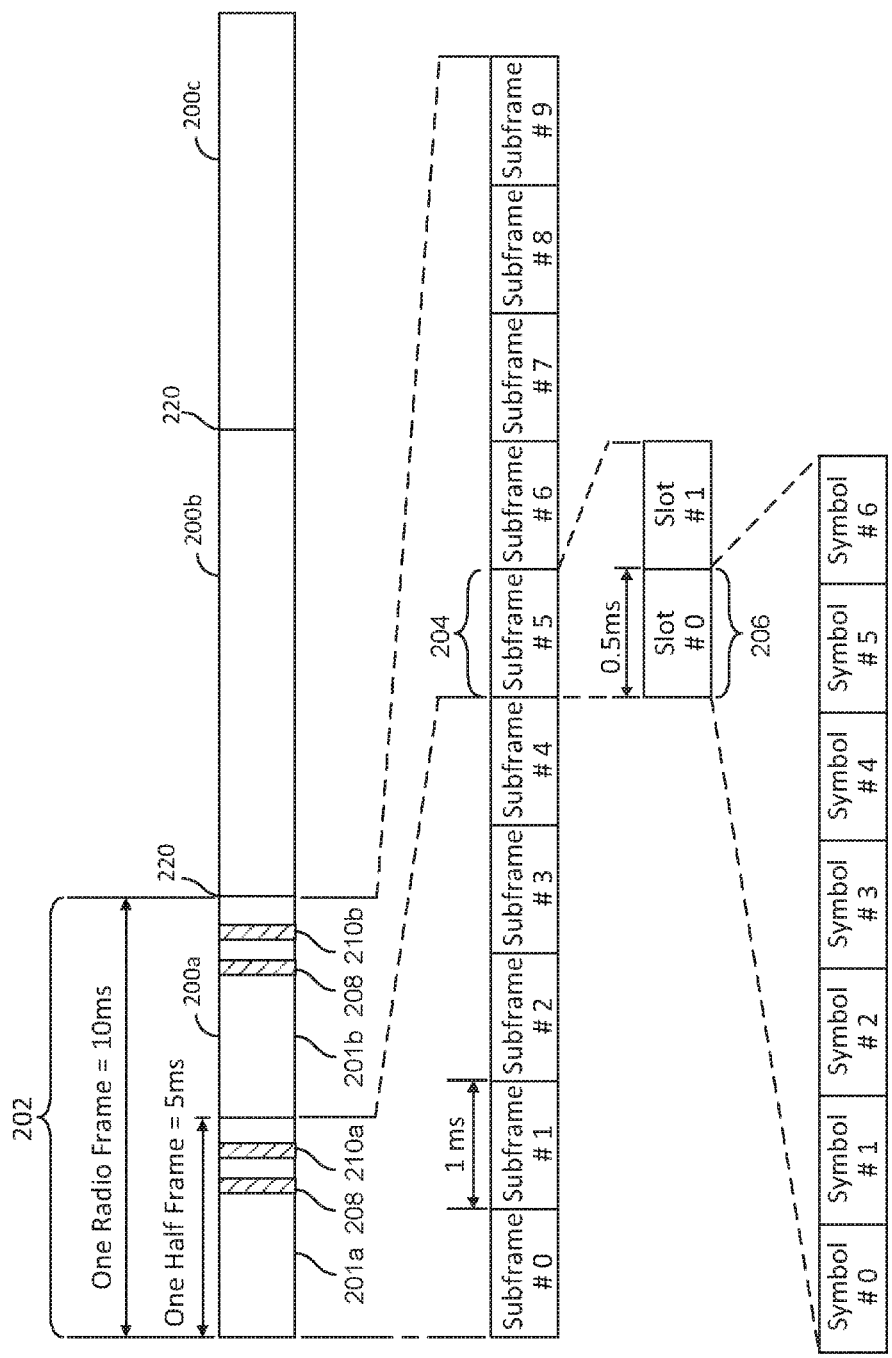
FIG. 2 shows a structure of a message frame according to an LTE protocol, in accordance with an embodiment of the present disclosure.

FIG. 2 shows an exemplary structure of a message frame according to the LTE protocol, in accordance with an embodiment of the present disclosure. In the frame structure as shown, each full "radio frame" 202 is 10 ms long and is separated by frame boundaries 220. Each radio frame 202 is divided into two 5 ms half-frames 201a and 201b (generally, half-frame 201). Each half-frame 201 is further divided into five 1 ms subframes 204, each of which includes two 0.5 ms slots 206. Depending on the length of the Cyclic Prefix (CP), each slot 206 may contain six or seven orthogonal frequency-division multiplex (OFDM) symbols. In the illustrative example shown in FIG. 2, a normal CP is used, leading to a total of seven. OFDM symbols. Systems and methods described in the present disclosure refer to the message frame structure shown in FIG. 2, although other frame structures are also possible. For example, each frame may be divided into 20 slots (or any other suitable number of slots), where each subframe is defined as two consecutive slots with appropriate indices.

Synchronization signals may be transmitted in every radio frame 202, and include both primary synchronization signals (PSS) and secondary synchronization signals (SSS). Both PSS and SSS may appear in fixed locations in both the time domain and the frequency domain in every frame 202. In the example shown in FIG. 2, the same PSS 208 is transmitted twice per frame 202, at a fixed location in both the time domain and the frequency domain in every half-frame 201. On the other hand, a pair of different SSS sequences, SSS 210a and 210b (generally, SSS 210), appear in the same fixed location in both the time domain and the frequency domain in every half-frame 201. For example, SSS 210a is transmitted in the even half-frames, while SSS 210b is transmitted in the odd half-frames. In the frequency domain, PSS 208 and SSS 210 may be mapped to a pre-determined number of subcarriers around the DC subcarrier so that no cell-specific channel bandwidth information is needed during synchronization.

Although shown in FIG. 2 as being offset from each other, the fixed locations of PSS 208 and SSS 210 in the time domain may be consecutive or adjacent to each other. Furthermore, FIG. 2 shows that PSS 208 occurs before SSS 210 in each half-frame 201. However, in general, SSS 210 may be located before or after PSS 208 within the half-frame 201. In one example, PSS 208 is mapped to the last OFDM symbol in slot 0 of subframes 0 and 5, while SSS 210 is mapped to the OFDM symbol immediately preceding PSS 208. In another example, PSS 208 is mapped to the third OFDM symbol in subframes 1 and 6, while SSS 210 is mapped to the second-to-last OFDM symbol in slot 0 of subframes 0 and 5.

In any case, because PSS 208 and SSS 210 always occur in the same place in each frame 202, information regarding the location of frame boundaries 220 may be determined from the time location of the synchronization signals, once the synchronization signals are identified. In the example shown in FIG. 2, identifying PSS 208 enables user equipment 104 to determine a timing of the boundary for a 5 ms half-frame 201. However, the location of boundary 220 (the 10 ms timing boundary of the radio frame 202) remains ambiguous because user equipment 104 is unable to determine which half-frame 201 is first. Subsequent identification of SSS pair 210a and 210b resolves this ambiguity and enables user equipment 104 to determine the 10 ms frame timing boundary 220. Having identified PSS 208 and SSS 210, user equipment 104 may also determine the cell's unique identity using Eq. 1.

As described above, in LTE, PSS 208 may be one of three sequences, corresponding to NID2=0, NID2=1, or NID2=2. Similarly, for each value of NID2, SSS 210 may be one of 168 pairs of sequences, corresponding to NID1=0, 1, 2, . . . 167. Lookup tables may be used to retrieve corresponding PSS and SSS sequences when a PCI, NID1 or NID1 is determined, or vice versa.

In some embodiments of the present disclosure, a synchronization signal is identified by user equipment 104 from a set of candidate synchronization signals as the candidate synchronization signal that is most similar to one or more portions of a received signal. In one example, user equipment 104 cross-correlates a received signal or sequence (for example, samples of received radio signal 106) with a set of candidate synchronization signals to obtain a set of cross-correlation signals. A candidate synchronization signal corresponding to the cross-correlation signal with the largest maximal amplitude may be identified as the synchronization signal in the received signal. In another example, different portions of a received signal may be combined across different frames or half-frames before cross-correlation operations are carried out. This combining may be performed in low SNR or fading environments, or when computation complexity and energy consumption is of concern. In either example, the set of candidate synchronization signals may include all possible PSS sequences, all possible SSS sequence pairs, or proper subsets thereof. For example, subsets may be appropriately used when it is known a priori that certain sequences or PCI values do not need to be considered.

In some embodiments, user equipment 104 computes a correlation between the received signal and each candidate synchronization signal to generate a set of correlation signals, each correlation signal being associated with a candidate synchronization signal. The correlation signals are cross-correlation signals that are the result of computing a cross-correlation between the received signal and each candidate synchronization signal. The correlation signals in the set are evaluated and scored by identifying a maximal amplitude in each signal. The correlation signal with the largest score is identified, and the associated candidate synchronization signal is selected. The selected candidate synchronization signal thus represents the candidate synchronization signal out of the entire set that is most strongly correlated with the true synchronization signal that was transmitted by base station 102.

After a single candidate synchronization signal is selected, the corresponding correlation signal is evaluated to obtain a delay value. The received signal is shifted in time by an amount corresponding to the delay value, such that a start time of the received signal is aligned with a start time of the synchronization signal. By temporally aligning the start times of the received signal and the synchronization signal, user equipment 104 is synchronized with base station 102. Processes for identifying a synchronization signal are described in more detail in relation to FIGS. 4-8.

Figure 3:
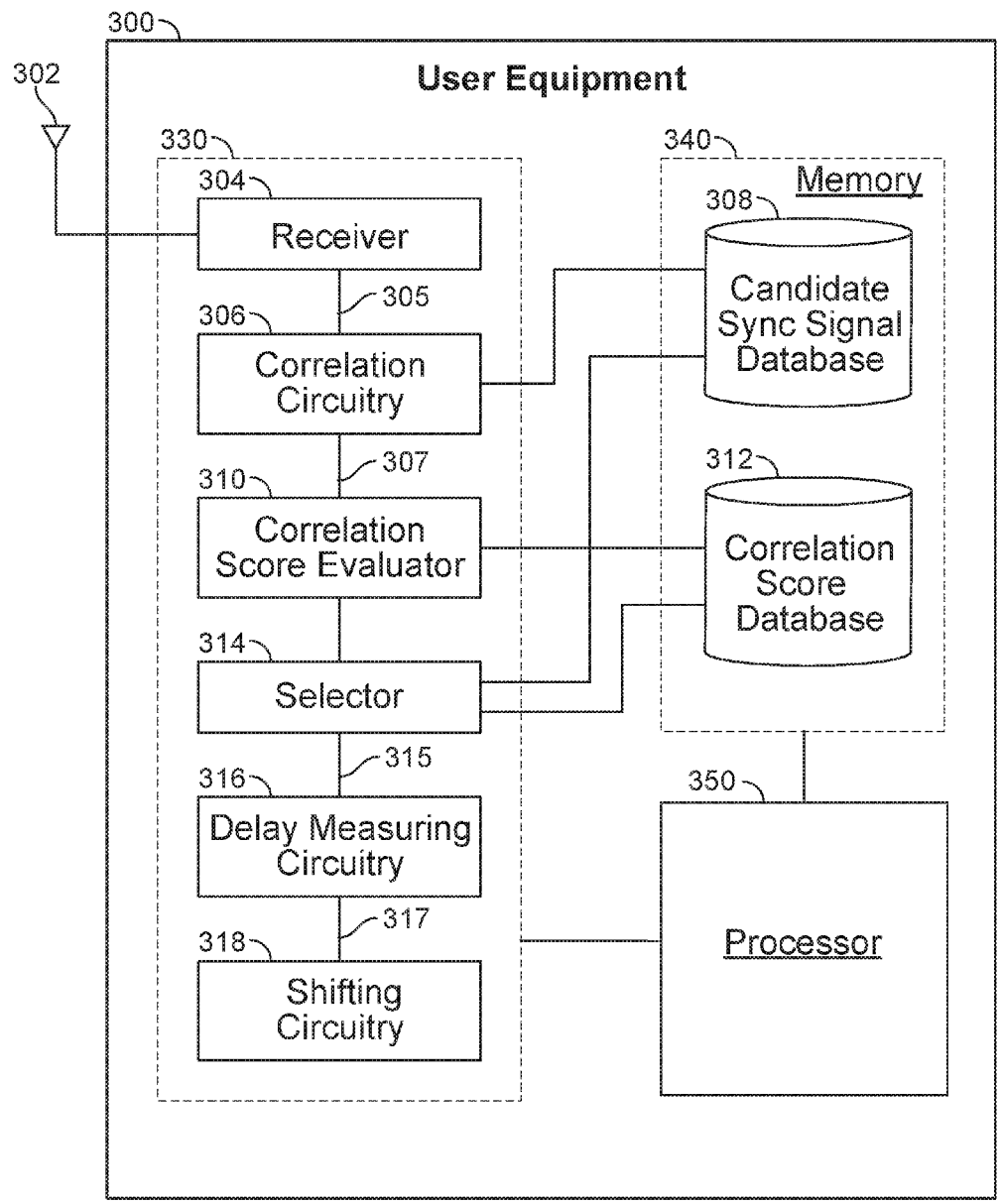
FIG. 3 shows an illustrative block diagram of a user equipment, in accordance with an embodiment of the present disclosure.

FIG. 3 shows a block diagram of a user equipment 300, which may be a more detailed representation of user equipment 104 of FIG. 1, in accordance with an embodiment of the present disclosure. User equipment 300 includes an antenna 302 for wireless transmission or reception, a synchronization circuitry 330, a memory 340, and a processor 350. Antenna 302 receives a signal, such as one or more of radio signals 106, from base station 102 and provides the received signal to synchronization circuitry 330, which determines a start time of the received signal that aligns or coincides with a start time of an identified synchronization signal. While shown as only one antenna, antenna 302 may represent more than one antenna, and each antenna may be connected to synchronization circuitry 330. As described herein, synchronization circuitry 330 is configured to identify PSSs, but in general, synchronization circuitry 330 may be configured to identify other types of synchronization signals, including but not limited to SSSs.

Memory 340 includes candidate synchronization signal database 308 and correlation score database 312. Candidate synchronization signal database 308 stores synchronization signals that may be transmitted by base station 102. The stored set of synchronization signals represents the set of possible synchronization signals that may be transmitted by base station 102. The set of stored synchronization signals may be stored in a time domain, a frequency domain, another suitable domain, or a combination thereof, and may be stored in database 308 for efficient access by synchronization circuitry 330. As is described in more detail below, synchronization circuitry 330 evaluates one or more of the candidate synchronization signals stored in database 308, and the evaluated scores may be saved to correlation score database 312. The correlation score is a metric that quantifies the similarity between two signals. In particular, the correlation score quantifies the similarities between a received signal, such as one of radio signals 106, with one of the candidate synchronization signals.

Synchronization circuitry 330 includes a receiver 204 that receives a signal from antenna 302. For example, receiver 304 may receive a modulated radio signal, such as radio signal 106. If the radio signal is modulated, the receiver 304 may demodulate the signal to generate a demodulated signal 305 before transmitting the demodulated signal 305 to correlation circuitry 306. In some embodiments, receiver 304 estimates a channel over which base station 102 communicates with user equipment 300. In this case, receiver 304 may perform inverse channel filtering of the received signal such that an effect of the channel on the received signal is equalized, and so that the received signal resembles the transmitted signal.

Correlation circuitry 306 accesses candidate synchronization signal database 308 to retrieve a set of candidate synchronization signals. As described above, the set of candidate synchronization signals corresponds to the set of possible synchronization signals that base station 102 may transmit. Correlation circuitry 306 processes demodulated signal 305 and the set of candidate synchronization signals. In one example, demodulated signal 305 is cross-correlated with each candidate synchronization signal to generate a cross-correlation signal associated with each of the candidate synchronization signals.

The cross-correlation is a measure of the similarity of two signals as a function of a time offset n applied between the two signals. In particular, the amplitude of a correlation signal is high for a time offset τ when one of the signals highly resembles a shifted version (shifted by τ) of the other signal. Furthermore, the amplitude of the correlation signal is low when one of the signals does not resemble a shifted version of the other signal. Thus, high amplitudes of a correlation signal may be identified to assess how similar a received signal is to a shifted version of a candidate synchronization signal (or equivalently, how similar a shifted version of the received signal is to a candidate synchronization signal). Furthermore, the time offsets that correspond to the high amplitudes provide an indication of an amount by which to shift the received signal or the candidate synchronization signal in order to align the two signals.

In an example, a cross-correlation signal $c_{m,p}[n]$ in the time domain (where n corresponds to a time offset value) may be described in terms of a received signal $y_m[n]$ of length $L_1$ in the time domain (0 to $L_1-1$), and a candidate synchronization signal $d_p[n]$ of length $L_2$ in a time domain (0 to $L_2-1$), for a discrete set of time offsets.

The cross-correlation performed by correlation circuitry 305 may be a circular cross-correlation, which may be performed by periodically extending $d_p[n]$ to have a length N, where N corresponds to a number of samples between half-frames or frames, and then cross-correlating the periodically extended signal and $y_m[n]$. In particular, $L_2$ is likely less than N because as described in relation to FIG. 2, the length of a synchronization signal is less than the length of a half-frame. Thus, periodically extending $d_p[n]$ may include zero padding the candidate synchronization signal to have length N, and then repeating the zero-padded sequence a number of times. The synchronization signal is known to be repeated every half-frame or frame, so periodically extending each candidate synchronization signal in this manner allows for a simple representation of the received synchronization signal. The periodic extension of $d_p[n]$ may be written as $d_{N,p}[n]$.

The cross-correlation function may be represented as the convolution between $y_m[n]$ and $d_{N,p}*[-n]$, or as the convolution between $y_m*[-n]$ and where the symbol * represents the complex conjugate. When the signals are real-valued, the cross-correlation of two real signals is simply the convolution of $y_m[n]$ and $d_{N,p}[-n]$ or the convolution of $y_m[-n]$ and $d_{N,p}[n]$.

$$c_{m,p}[n] = (y_m * d_{N,p})[n] = \sum_{l=-\infty}^{\infty} y_m[l] d_{N,p}^*[n+l] \quad (2)$$

In Eq. 2, the symbol * corresponds to a cross-correlation function, p corresponds to a candidate synchronization signal index that identifies a particular candidate synchronization signal in a set of P candidate synchronization signals that are periodically extended, n corresponds to a time coordinate value, and m corresponds to a symbol index that identifies a particular symbol in the received signal $y_m[n]$. Performing the computation of Eq. 2 in a time domain is computationally expensive due to the number of calculations required. To reduce the computational cost of performing the cross-correlation, correlation circuitry 306 may be configured to perform the cross-correlation in a frequency domain. Data access and storage costs are also reduced if the candidate synchronization signals are stored in candidate synchronization signal database 308 in the frequency domain.

To perform the computation of Eq. 2 in the frequency domain, a frequency representation of the received signal ($Y_m[k]$ as defined in Eq. 3, where k is a frequency coordinate value) and a frequency representation of the candidate synchronization signals ($D_p[k]$ as defined in Eq. 4) are obtained.

$$Y_m[k] = FFT[y_m[n]] \quad (3)$$

$$D_p[k] = FFT[d_p[n]] \quad (4)$$

In Eq. 3, a frequency domain representation of a particular symbol at symbol index m in the received signal $Y_m[k]$ is obtained by computing a Fast Fourier Transform (FFT) of the time domain representation of the received signal $y_m[n]$. For example, a 128 FFT may be computed using any known FFT algorithms. In Eq. 3, a frequency domain representation of the candidate synchronization signal $D_p[k]$ is obtained by computing a FFT of the time domain representation of the candidate synchronization signal $d_p[n]$. In general, any other suitable frequency transform may be used to convert from the time domain to the frequency domain. For example, a discrete Fourier transform, discrete time Fourier transform, Z-transform, Laplace transform, or any other suitable transform may be performed.

After a frequency representation of the received signal $Y_m[k]$ and a frequency representation of the candidate synchronization signal $D_p[k]$ are obtained, a frequency domain representation of a circular cross-correlation signal $C_{m,p,\tau}[k]$ is determined. In particular, the candidate synchronization signal $d_p[n]$ is periodically extended to have a period corresponding to the length of a frame or half-frame N, resulting in periodically extended signal $d_{N,p}[n]$. The frequency domain representation of $d_{N,p}[n]$ is denoted $D_{N,p}[k]$.

Cross-correlation between two signals in the time domain corresponds to time convolution between one of the signals and a time reversed complex conjugate of the other signal. In other words, the cross-correlation between $y_m[n]$ and $d_{N,p}[n]$ may be represented as the convolution between $y_m[n]$ and $d_{N,p}*[-n]$. However, assuming that both signals are real, the cross-correlation may simply correspond to the time convolution between a signal and a time reversed version of the other signal. That is, the cross-correlation between $y_m[n]$ and $d_{N,p}[n]$ may be represented as the convolution between $y_m[n]$ and $d_{N,p}[-n]$. Furthermore, because time reversal in the time domain is represented as a complex conjugate in the frequency domain, the complex conjugate of the frequency domain representation of the candidate synchronization signal $D_{N,p}*[k]$ is used. The frequency domain representation of the cross-correlation signal $C_{m,p,\tau}$ may be written as:

$$c_{m,p,\tau}[k] = \sum_{k=0}^{L+N-1} Y_{k,m}[k] D^*_{mod(k+\tau,N),p}[k] \quad (5)$$

Correlation circuitry 306 may use Eq. 5 to compute the sum of various products between $Y_m[k]$ and $D_{N,p}*[k]$.

In accordance with Eq. 6a, correlation circuitry 306 transforms the frequency domain representation of the correlation signal $C_{m,p,\tau}[k]$ into a time domain representation $c_{m,p}[n]$ by performing an Inverse Fast Fourier Transform (IFFT), and transmits cross-correlation signals 307 to a correlation score evaluator 310. In some embodiments, the time domain representation of the correlation signal $c_{m,p}[n]$ is squared, as shown by Eq. 6b. Squaring the time domain representation of the cross-correlation signal may amplify peaks of the cross-correlation signal before sending the cross-correlation signal to correlation score evaluator 310.

$$c_{m,p}[n]=\text{IFFT}[C_{m,p,\tau}[k]] \quad (6a)$$

$$[c_{m,p}[n]]^2=[\text{IFFT}[C_{m,p,\tau}[k]]]^2 \quad (6b)$$

In some embodiments, user equipment 300 includes more than one antenna. In this case, each antenna has a corresponding cross-correlation signal $c_{m,p,s}[n]$ where s represents an antenna index. Synchronization circuitry 330 computes a cross-correlation signal for each antenna similarly to the case where user equipment 300 has only one antenna 302. After synchronization circuitry 330 computes the time domain representation of each cross-correlation signal $c_{m,p,s}[n]$ associated with a respective antenna s, synchronization circuitry 330 may combine the cross-correlation signals from each antenna using an averaging technique such as maximal ratio combining (MRC), equal gain averaging, or any other suitable averaging technique Correlation score evaluator 310 evaluates each cross-correlation signal $c_{m,p}[n]$ to obtain a set of correlation scores. Each correlation score is derived from a correlation signal $c_{m,p}[n]$ and represents a maximum similarity between the candidate synchronization signal $d_p[n]$ and the received signal $y_m[n]$, across various time offsets. In some embodiments, the correlation score is a maximum amplitude of the cross-correlation signal $c_{m,p}[n]$.

In some embodiments, correlation score evaluator 310 quantizes the correlation score. For example, the correlation score may be converted from a numerical representation to a letter grade. In some embodiments, the correlation score is normalized by a value that represents a variance or standard deviation of the overall cross-correlation signal. In other embodiments, the correlation score is normalized by a value that represents the energy of the overall cross-correlation signal. The correlation score evaluator 310 may store each of the calculated correlation scores in a correlation score database 312 located in memory 340.

Correlation score evaluator 310 transmits correlation scores to be stored in correlation score database 312. Selector 314 retrieves data stored in candidate synchronization signal database 308 and correlation score database 312 to select one of the candidate synchronization signals. For example, selector 314 compares each correlation score in the correlation score database to determine a maximum correlation score. Selector 314 may then select a candidate synchronization signal that corresponds to the maximum correlation score in correlation score database 312. The selected candidate synchronization signal may be denoted as the $\hat{p}^{th}$ candidate synchronization signal. In another example, selector 314 compares each cross-correlation score with a predetermined threshold value. Selector 314 may then select the first candidate synchronization signal that corresponds to a correlation score which exceeds the threshold value. The selected candidate synchronization signal represents the most likely synchronization signal that base station 102 is transmitting. Once the transmitted synchronization signal is determined, user equipment 300 may set up initial access procedures to receive and transmit data. The initial access procedures may include determining a PCI, time slot, frame synchronization, or any other suitable information so that user equipment 300 may read information from transmitted radio signals 106, as described above with respect to FIGS. 1 and 2.

Selector 314 transmits the selected candidate synchronization signal 315 to delay measuring circuitry 316. Delay measuring circuitry 316 evaluates the cross-correlation signal $c_{m,\hat{p}}[n]$ corresponding to the selected candidate synchronization signal $d_{\hat{p}}[n]$ to determine a delay value $\hat{\tau}$. The delay value $\hat{\tau}$ may be represented by a time offset from a reference point to a time coordinate of the maximum amplitude of the cross-correlation signal. Thus, the delay value $\hat{\tau}\tau$ may be obtained by measuring the distance between the reference point and maximum amplitude of the cross-correlation signal. In an example, the reference point is the time coordinate corresponding to a time value of zero.

Delay measuring circuitry 316 transmits the measured delay value 317 ($\hat{\tau}$) to shifting circuitry 318. The shifting circuitry 318 may shift the received signal by the delay value $\hat{\tau}$ in a time domain to identify the start time of the synchronization signal within the received signal and to therefore align a time of the received signal with a start of a synchronization signal.

Synchronization circuitry 330 and other circuits (not shown) in user equipment 300 may include any suitable communications circuitry (e.g., a modem) (not shown) coupled to antenna 302 to receive and demodulate incoming data from a base station (e.g., base station. 102 of FIG. 1).

Synchronization circuitry 330 may include a single processor, or may include several processors each of which is configured to perform one or more cellular telephone functions. For example, synchronization circuitry 330 may include a modem processor and an application processor. The processors may be hardware, software, or firmware-based processors. Any suitable variation of FIG. 3 may be used to receive, transmit, process, and store data. For example, additional processors or memory units may be used to process or store data such as processor 350. Processor 350 may communicate with any element of synchronization circuitry 330 or databases in memory 340. Furthermore, as shown in FIG. 3, memory 340 includes candidate synchronization signal database 308 and correlation score database 312. However, in general, memory 340 may include one or both of the databases 308 and 312, or memory 340 may include any suitable storage device or combination of storage devices for data such as hard disk drives, solid state memory, RAM, or ROM.

FIG. 4 is a high level flow chart of a process 400 for detecting primary synchronization signals, in accordance with an embodiment of the present disclosure. User equipment 300 may execute process 400 by receiving, at a receiver, a signal from a transmitter wherein the signal includes a received synchronization signal (402). Process 400 further includes processing the received signal and a plurality of candidate synchronization signals to obtain a plurality of correlation signals (404). Each candidate synchronization signal is associated with one of the plurality of correlation signals. Process 400 further includes selecting, based at least in part on the plurality of correlation signals, one of the plurality of candidate synchronization signals wherein the selected candidate synchronization signal is correlated with the received synchronization signal (406). Process 400 further includes detecting the received synchronization signal based at least in part on the received signal and a characteristic obtained from the correlation signal that is associated with the selected candidate synchronization signal (408).

At 402, user equipment 300 receives a signal $y_m[n]$ from a transmitter such as base station 102 that includes a received synchronization signal. As is described in relation to FIG. 2, the received signal may include one or more radio frames. For example, the received signal may include one or more radio frames based on a 3GPP LTE specification particular, a received signal may include a primary synchronization signal and a secondary synchronization signal. The one or more synchronization signals may be repeated in each radio frame or in each half-frame.

At 404, user equipment 300 processes the received signal $y_m[n]$ and a plurality of candidate synchronization signals and $d_p[n]$ to obtain a plurality of correlation signals $c_{m,p}[n]$. As described in relation to FIG. 3, the correlation signal $c_{m,p}[n]$ may be a cross-correlation signal, where the time coordinate of the correlation signal corresponds to a temporal offset between the signals $y_m[n]$ and $d_p[n]$, and the amplitude of the correlation signal corresponds to a similarity between the signals $y_m[n]$ and a version of $d_p[n]$ shifted by the temporal offset. User equipment 300 computes the cross-correlation between the received signal $y_m[n]$ and each of the plurality of candidate synchronization signals $d_p[n]$ to obtain the plurality of correlation signals $c_{m,p}[n]$. The correlations may be performed in a time domain or a frequency domain, but the frequency domain may be used to save on computational costs. The frequency domain representation of the cross-correlation may be converted to a time domain for further processing.

At 406, user equipment 300 selects one of the plurality of candidate synchronization signals based at least in part on the plurality of correlation signals. The selected candidate correlation signal $d_p[n]$ is correlated with the received synchronization signal (i.e., the synchronization signal in the received signal $y_m[n]$). To select a candidate correlation signal, user equipment 300 may evaluate each of the plurality of correlation signals for a correlation score $S_p$. The correlation score $S_p$ is a metric that represents the similarity of the received signal $y_m[n]$ with one of the plurality of candidate synchronization signals $d_p[n]$. In some embodiments, the correlation score $S_p$ may be a numerical value (such as an amplitude of a correlation signal or the maximum peak amplitude of a correlation signal, for example). The correlation score $S_p$ may be normalized by a metric that represents a variance of the correlation signal. For example, the correlation score may be normalized by a standard deviation.

In some embodiments, the correlation scores $S_p$ are stored in a correlation score database 312 in memory 340, and the scores may be sorted in any suitable manner. For example, the cross-correlation scores may be sorted based on a maximum amplitude value. The maximum cross-correlation score represents the most likely candidate synchronization signal that is being transmitted by base station 102. User equipment 300 may compare correlation scores to select one of the plurality of candidate synchronization signals. User equipment 300 may compare each of the plurality of correlation scores with a threshold and select the first correlation signal that is greater than the threshold. In some embodiments, the threshold is optionally updated when a new candidate synchronization signal is considered. In particular, the threshold may correspond to the maximal correlation score out of the scores that have been evaluated. For example, if a current correlation score exceeds the current threshold, the threshold is updated to the current correlation score. Otherwise, if a current correlation score is below the current threshold, the threshold may not be updated. In general, user equipment 300 selects the candidate synchronization signal that is associated with the highest correlation score because the signal with the highest score corresponds to the signal that is most similar to the received synchronization signal (and therefore the most likely synchronization signal that was transmitted by base station 102.

At 408, user equipment 300 detects the received synchronization signal based at least in part on the received signal $y_m[n]$ and a characteristic obtained from the cross-correlation signal that is associated with the selected candidate synchronization signal. In some embodiments, the characteristic is a delay value corresponding to a temporal distance between a reference point (i.e., correspond to a time coordinate of zero in the correlation signal) to a peak amplitude of the correlation signal $c_{m,p}[n]$ associated with the selected candidate synchronization signal $d_p[n]$. In some embodiments, the peak amplitude is the maximum amplitude of the correlation signal $c_{m,p}[n]$. The time coordinate $\hat{\tau}$ of the maximum amplitude of the correlation signal $c_{m,p}[n]$ represents the temporal offset for which the received signal $y_m[n]$ and the selected candidate synchronization signal $d_p[n]$ are the most similar. To detect the received synchronization signal, the received signal $y_m[n]$ is temporally shifted by an amount corresponding to $\hat{\tau}$ such that a start of the shifted received signal is aligned with a start of the received synchronization signal.

Figure 5:
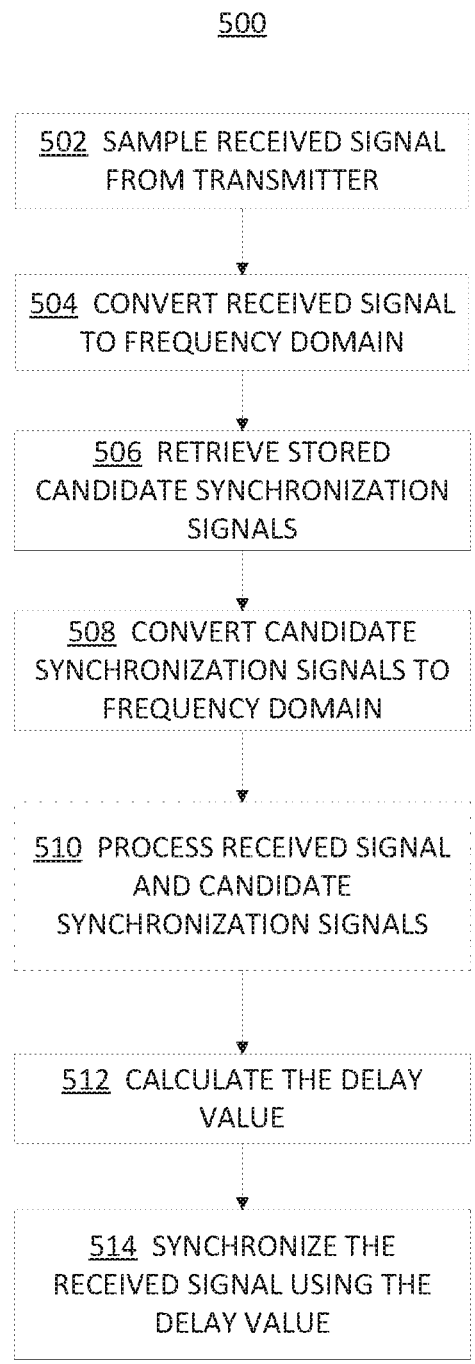
FIG. 5 shows a flow diagram of a process for synchronizing a received signal using a delay value, in accordance with an embodiment of the present disclosure.

FIG. 5 is a flow diagram of a process 500 for detecting primary synchronization signals, in accordance with an embodiment of the present disclosure. Synchronization circuitry 330 may execute process 500 by sampling a received signal from a transmitter (502), converting the received signal to a frequency domain (504), retrieving stored candidate synchronization signals (506), converting the candidate synchronization signals to a frequency domain (508), processing the received signal and candidate synchronization signals (510), calculating the delay value (512), and synchronizing the received signal using the delay value (514).

At 502, the synchronization circuitry 330 samples a received signal $y_m[n]$ from a transmitter. The received signal may be a radio signal such as one of radio signals 106 which may be modulated or demodulated. Synchronization circuitry 330 may sample a predetermined length of the received signal or continuously sample the received signal in real time. In general any suitable sampling technique may be used. The received signal may be processed in any number of ways, such as to remove an effect of a channel or one or more interfering sources, in order to obtain a received signal $y_m[n]$ that closely resembles the signal transmitted by base station 102.

At 504, the received signal $y_m[n]$ is converted to a frequency domain. In certain embodiments, the received signal may be converted to a frequency domain using a Fast Fourier Transform (FFT) function that rapidly computes the discrete Fourier transform. At 506, synchronization circuitry 330 retrieves stored candidate synchronization signals $d_p[n]$, which may be stored in candidate synchronization signal database 308 in memory 340. The stored candidate synchronization signals $d_p[n]$ represent the set of possible synchronization signals that base station 102 may transmit. In an example, the candidate synchronization signals may be sorted based on a likelihood of being transmitted by base station 102. In this case, more likely candidate synchronization signal are indexed earlier than less likely candidate synchronization signals. If necessary, synchronization circuitry 330 may update the set of candidate synchronization signals by communicating with base station 102 or with any other suitable device that may provide information regarding the set of candidate synchronization signals.

At 508, synchronization circuitry 330 converts the candidate synchronization signals $d_p[n]$ to a frequency domain. In certain embodiments, the candidate synchronization signals $d_p[n]$ may be converted to a frequency domain using a Fast Fourier Transform (FFT) function that rapidly computes the discrete Fourier transform. In general, other frequency transforms may be used. While any suitable transform may be used to transform the received signal $y_m[n]$ and the candidate synchronization signals $d_p[n]$ into a frequency domain, the same transform should be used to transform the received signal and the candidate synchronization signals. In some embodiments, synchronization circuitry 330 may omit 508 if the candidate synchronization signals $d_p[n]$ are already stored in candidate synchronization signal database 308 in a frequency domain.

At 510, synchronization circuitry 330 processes the received signal $y_m[n]$ and candidate synchronization signals $d_p[n]$ to obtain a set of cross-correlation signals $c_{m,p}[n]$, which are used to select a candidate synchronization signal $d_{\hat{p}}[n]$. The selected candidate synchronization signal $d_{\hat{p}}[n]$ represents the candidate synchronization signal that is the most likely to be the synchronization signal that is transmitted by base station 102. This processing will be described in further detail in relation to FIGS. 6 and 7. To process the received signal $y_m[n]$ and the candidate synchronization signals $d_p[n]$, the received signal is multiplied with each candidate synchronization signal in the frequency domain and the result is converted to a time domain to obtain a cross-correlation signal $c_{m,p}[n]$. The cross-correlation signals are evaluated for correlation scores $S_p$, and a maximum correlation score is selected. The corresponding candidate synchronization signal (with the highest correlation score $S_p$, for example) is the selected candidate synchronization signal $d_{\hat{p}}[n]$, and the associated $c_{m,\hat{p}}[n]$ cross correlation signal is evaluated for a time coordinate $\hat{\tau}$, which corresponds to a delay value.

At 512, delay measuring circuitry 316 determines a delay value $\hat{\tau}$ from the cross-correlation signal $c_{m,\hat{p}}[n]$ that is associated with the selected candidate synchronization signal $d_{\hat{p}}[n]$. To obtain a delay value, delay measuring circuitry 316 may evaluate a distance from a reference point (such as a time coordinate of zero, for example) to a maximum amplitude of the cross-correlation signal. If more than one peak is determined to be a maximum amplitude of the signal (e.g. two amplitudes share a substantially similar value that is the maximum value of the cross-correlation signal), then synchronization circuitry may select any of the maximum amplitudes from which to compute a delay value.

At 514, shifting circuitry 318 synchronizes the received signal using the delay value $\hat{\tau}$. Shifting circuitry 318 shifts the received signal $y_m[n]$ in a time domain by the delay value $\hat{\tau}$ to identify a location of the received synchronization signal. Once the received synchronization signal and its location are identified, synchronization circuitry 330 may determine frame boundaries, the PCI, or both. The PCI is used for cell identification and channel synchronization and has a range from 0 to 503 in the 3G PP LTE specification. The PCI establishes locations of cell-specific information in a radio frame, such as radio frame 200 shown in FIG. 2. This information may include reference signals and control information specific to the PCI. Once the PCI is acquired by identifying one or more synchronization signals, user equipment 300 may identify the locations of the cell-specific information in the radio frame. User equipment 300 may also synchronize the time slot and frames once the one or more synchronization signals are identified. In particular, since synchronization signals are repeated in each radio frame at known subframes, the frame boundaries 220 may be identified after the one or more synchronization signals are identified.

Figure 6:
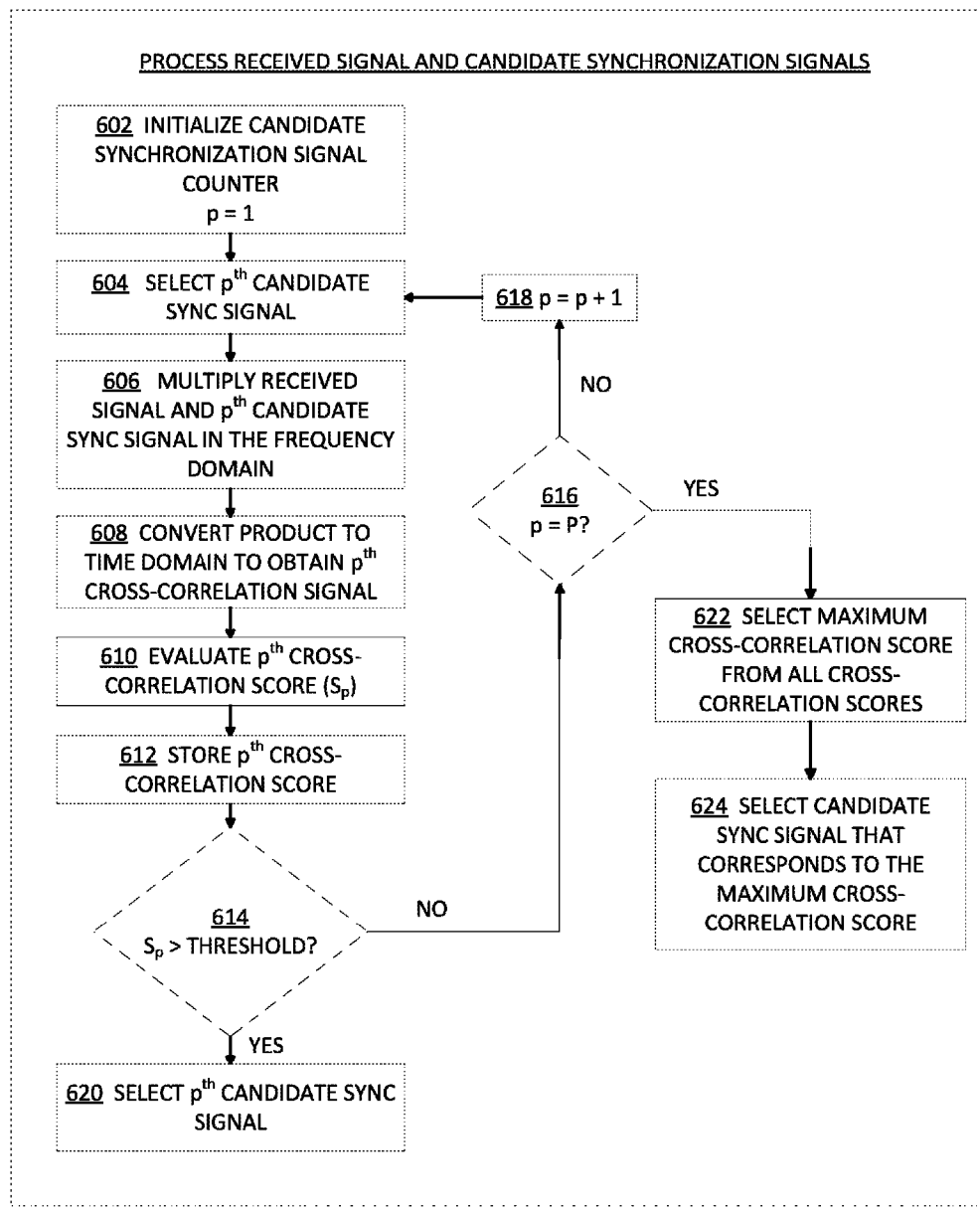
FIG. 6 shows a flow diagram of a process for processing a received signal and candidate synchronization signals to select a candidate synchronization signal, in accordance with an embodiment of the present disclosure.

FIG. 6 is a flow diagram of a process 600 for processing a received signal and candidate synchronization signals, in accordance with an embodiment of the present disclosure. Synchronization circuitry 330 executes process 600 by initializing a candidate synchronization signal counter p (602), selecting the $p^{th}$ candidate synchronization signal (604), multiplying: the received signal and the $p^{th}$ candidate synchronization signal (606), converting the product to a time domain to obtain the $p^{th}$ cross-correlation signal (608), evaluating a $p^{th}$ cross-correlation score (610), storing the $p^{th}$ cross-correlation score $S_p$ (612), and testing if the $p^{th}$ cross-correlation score $S_p$ is greater than a threshold (614). If $S_p$ is greater than the threshold, synchronization circuitry 330 selects the $p^{th}$ candidate synchronization signal (620). If $S_p$ is not greater than the threshold, synchronization circuitry tests if candidate synchronization signal counter p equals the total number of candidate synchronization signals P (616). If the candidate synchronization signal counter p is equal to the total number of candidate synchronization signals P, synchronization circuitry 330 selects a maximum cross-correlation score from all cross-correlation scores (622) and selects a candidate synchronization signal that corresponds to the maximum cross-correlation score (624). If the candidate synchronization signal counter p is not equal to the total number of candidate synchronization signals P, synchronization circuitry increments the counter p (618).

At 602, synchronization circuitry 330 initializes a candidate synchronization signal counter p. Candidate synchronization signal counter p is an iteration parameter that refers to one of the candidate synchronization signals stored in candidate synchronization signal database 308 in memory 340. The counter p may be initialized at 1 and begin processing at the first candidate synchronization signal stored in candidate synchronization signal database 308. After a candidate synchronization signal is processed, counter p is incremented and the next candidate synchronization signal is considered until all P candidate synchronization signals have been considered.

At 604, synchronization circuitry 330 selects the $p^{th}$ candidate synchronization signal $d_p[n]$ from the candidate synchronization signal database 308. At 606, synchronization circuitry 330 multiplies the frequency domain representations of the received signal $y_m[n]$ and the $p^{th}$ candidate synchronization signal $d_p[n]$. As is described in relation to FIG. 3, the multiplication of the received signal and a candidate synchronization signal in the frequency domain represents a cross-correlation in the time domain.

At 608, the product of the multiplication (which is the cross-correlation signal in the frequency domain) is converted to a time domain to obtain $p^{th}$ cross-correlation signal $c_{m,p}[n]$ associated with the $p^{th}$ candidate synchronization signal $d_p[n]$. To convert to a time domain, an Inverse Fast Fourier Transform (IFFT) may be performed on the cross-correlation signal in the frequency domain, as shown by Eq. 6. The IFFT is a function that rapidly computes the inverse of the Discrete Fourier Transform.

At 610, synchronization circuitry 330 evaluates the $p^{th}$ cross-correlation score ($S_p$) associated with the $p^{th}$ cross-correlation signal $c_{m,p}[n]$. The $p^{th}$ correlation score $S_p$ represents the similarity between the p candidate synchronization signal $d_p[n]$ and the received signal $y_m[n]$. In certain embodiments, the correlation score may be a quantity that corresponds to a maximal amplitude of the $p^{th}$ cross-correlation signal.

At 612, synchronization circuitry 330 stores the $p^{th}$ cross-correlation score $S_p$ in correlation score database 212 located in memory 340. The correlation scores $S_p$ may be stored in any suitable manner. For example, the correlation scores $S_p$ may be stored based on being associated with the candidate synchronization signal $d_{\hat{p}}[n]$ with the highest likelihood of being the transmitted synchronization signal. In this case, a higher correlation score will be stored first. The correlation scores may be sorted after they are stored in correlation score database 212. For example, after being stored the cross-correlation scores may be sorted from highest cross-correlation score to lowest cross-correlation score in correlation score database 212. In another embodiment, cross-correlation scores may be sorted from lowest cross-correlation score to highest cross-correlation score. In another embodiment, only the highest correlation score may be stored in addition to a pointer to the corresponding candidate synchronization signal.

At 614, user equipment 300 compares $S_p$ to a predetermined threshold, which may be fixed or dynamically adjusted. In one example, the threshold is fixed. In this case, the predetermined threshold may be an amplitude for which it is known that if $S_p$ exceeds the threshold, then the current candidate synchronization signal is selected as $d_{\hat{p}}[n]$ at 620. However, if $S_p$ is below the threshold, user equipment. 300 proceeds to 616 to determine whether all P candidate signals have been considered. If not, the iteration parameter p is incremented at 618, and process 600 returns to 604 to select the next candidate synchronization signal $d_p[n]$.

In another example, the threshold requirement at 614 is not satisfied until all P candidate synchronization signals have been considered (the threshold may have an infinite value, for example). In this case, the maximum score is selected at 622 from all the cross-correlation scores that were evaluated, and the corresponding candidate synchronization signal $d_{\hat{p}}[n]$ is selected at 624.

In another example, the threshold at 614 may be dynamically updated to be equal to the highest cross-correlation score considered in the set of scores $S_1, S_2, \ldots, S_p$. In this case, when p equals 1 (when the first candidate is being considered), the threshold is set to $S_1$. As each candidate synchronization signal $d_p[n]$ is considered, a new $S_p$, is evaluated, and if $S_p$ is greater than the threshold, the threshold is replaced with S. Otherwise, the threshold is not updated if $S_p$ is less than the threshold. In this example, when all candidate synchronization signals have been considered, the threshold value corresponds to the maximum score, and the corresponding candidate synchronization signal $d_{\hat{p}}[n]$ is selected at 624.

Figure 7:
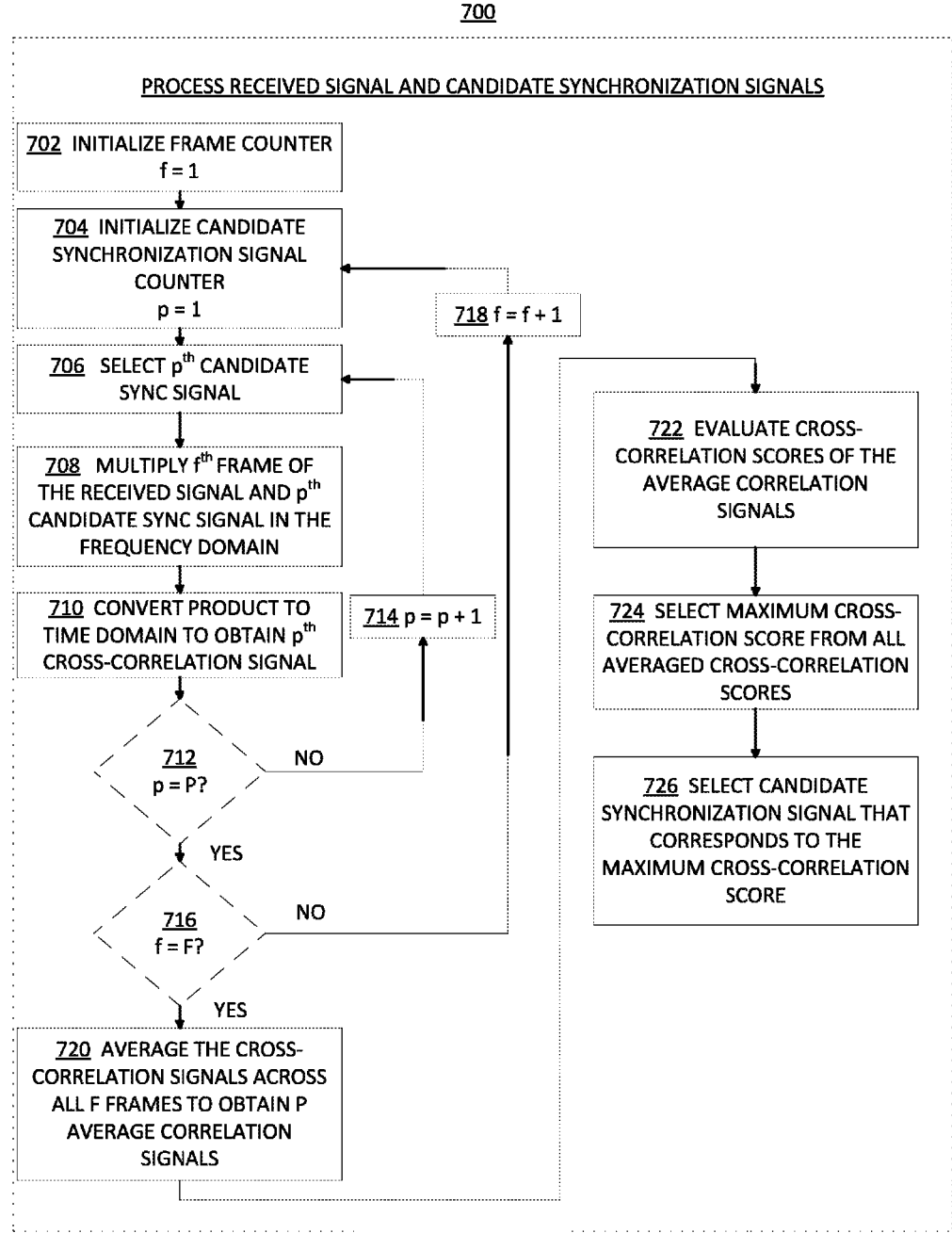
FIG. 7 shows a flow diagram of a process for processing a received signal and candidate synchronization signals over multiple radio frames to select a candidate synchronization signal, in accordance with an embodiment of the present disclosure.

FIG. 7 is a flow diagram of a process 700 for processing a received signal and candidate synchronization signals over multiple radio frames to select a candidate synchronization signal, in accordance with an embodiment of the present disclosure. Synchronization circuitry 330 may execute process 700 by initializing a frame counter f (702), initializing a candidate synchronization signal counter p (704), selecting the $p^{th}$ candidate synchronization signal (706), multiplying the $f^{th}$ frame of the received signal and the $p^{th}$ candidate synchronization signal in a frequency domain (708), converting the product to a time domain to obtain the $p^{th}$ cross-correlation signal (710), and determining whether all candidate signals have been considered (712). If not, synchronization circuitry 330 increments p and selects the next candidate synchronization signal (714). Otherwise, synchronization circuitry 330 tests if frame counter f equals the desired number of frames F (716). If the frame counter f has not reached the desired number of frames F over which averaging should occur, then synchronization circuitry 330 increments frame counter f (718). If the frame counter f has reached the maximum number of frames F, synchronization circuitry 330 averages the cross-correlation signals across all F frames to obtain. P average correlation signals (720), evaluates the cross-correlation scores of the average correlation signals (722), selects a maximum cross-correlation score from all averaged cross-correlation scores (724), and selects a candidate synchronization signal that corresponds to the maximum cross-correlation score (726).

Process 700 is similar to process 600 described in relation to FIG. 6, but process 700 includes an additional step of averaging the cross-correlation signals over a predetermined number of half-frames. Averaging the cross-correlation signals over multiple half-frames improves the signal-to-noise ratio by amplifying the high peaks in the cross-correlation signals. Thus, synchronization circuitry 330 may use process 700 to identify a received synchronization signal in fading environments or low signal-to-noise ratio (SNR) conditions.

At 702, synchronization circuitry 330 initializes a frame counter £ to a value of 1. The frame counter f refers to which half-frame that synchronization circuitry 330 is currently processing, and is incremented up to a predetermined desired number of half-frames F over which data will be averaged.

At 704, synchronization circuitry 330 initializes a candidate synchronization signal counter p. Candidate synchronization signal counter p refers to one of the candidate synchronization signals $d_p[n]$ stored in memory 340. The counter p may be initialized at 1 and begin processing at the first candidate synchronization signal $d_1[n]$ stored in candidate synchronization signal database 308. The counter p is incremented up to a predetermined number of candidate synchronization signals P.

At 706, synchronization circuitry 330 selects the $p^{th}$ candidate synchronization signal $d_p[n]$ from the candidate synchronization signal database 308. At 708, synchronization circuitry 330 multiplies the received signal from the $f^{th}$ frame and the $p^{th}$ candidate synchronization signal in the frequency domain. The multiplication of the received signal and a candidate synchronization signal in the frequency domain represents a cross-correlation in the time domain.

At 710, the product of the multiplication is converted to a time domain to obtain the $p^{th}$ cross-correlation signal $c_{m,p,f}[n]$, which is associated with the $p^{th}$ candidate synchronization signal $d_p[n]$ for the $f^{th}$ frame. Once the cross-correlation signal has been converted to a time domain representation, the cross-correlation signal $c_{m,p,f}[n]$ may be stored in a cross-correlation signal database (not shown) in memory 340. Storing the cross-correlation signals $c_{m,p,f}[n]$ enables synchronization circuitry 330 to average the cross-correlation signals across F frames.

At 712, synchronization circuitry 330 determines whether the candidate synchronization signal counter p is equal to the number of candidate synchronization signals P in the candidate synchronization signal database 308. If there are more candidate synchronization signals to consider, synchronization circuitry 330 increments the counter p at 714 and returns to 706 to select the next candidate synchronization signal.

Otherwise, if the synchronization circuitry 330 determines that the last cross-correlation signal $c_{m,P}[n]$ has been obtained for the $f^{th}$ frame, then at 716, synchronization circuitry 330 determines whether frame counter f has reached the predetermined desired number of frames F over which data will be averaged. If f has not reached the desired number of frames F, then at 718, user equipment increments the frame counter f.

Otherwise, if frame counter f has reached the desired number of frames F, then at 720, synchronization circuitry 330 averages the cross-correlation signals $c_{m,p,f}[n]$ across the F frames to obtain P average correlation signals $\bar{c}_{m,p}[n]$.

$$\bar{c}_{m,p}[n] = \frac{1}{F}\sum_{f=0}^{F-1} c_{m,p,f}[n] \qquad (7)$$

Eq. 7 calculates the average cross-correlation signal $\bar{c}_{m,p}$ of the cross-correlation signals $c_{m,p,f}[n]$ over F frames (where f corresponds to the frame index having length F). Eq. 7 sums the cross-correlation signals computed from each frame f up to the maximum number of frames F and divides by F to obtain the average cross-correlation signal $\bar{c}_{m,p}[n]$.

While Eq. 7 demonstrates one averaging technique that assigns equal weights to each frame, other averaging techniques may be used. For example, in certain embodiments, a weighted averaging technique may be used such that frames with high quality received data are weighted more heavily than frames with lesser quality. In particular, a quality of a frame may be assessed based on an estimate of an amount of noise in the data received in the frame. The averaging may include maximal ratio combining (MRC), equal gain averaging, or any other suitable averaging technique.

At 722, synchronization circuitry 330 evaluates cross-correlation scores $S_p$ for the average correlation signals $\bar{c}_{m,p}[n]$. The cross-correlation scores $S_p$ are derived from each of the P average correlation signals $\bar{c}_{m,p}[n]$. The average correlation signal $\bar{c}_{m,p}[n]$ represents a similarity between the associated candidate synchronization signal $d_p[n]$ and the received signal $y_m[n]$ over F frames. The cross-correlation score $S_p$ is a rating of this similarity and may correspond to a maximum amplitude of the average correlation signal $\bar{c}_{m,p}[n]$.

In some embodiments, synchronization circuitry 330 compares each cross-correlation score $S_p$ of the average cross-correlation signals $\bar{c}_{m,p}[n]$ with a predetermined threshold, such as at 614 of process 600. If $S_p$ does not exceed the threshold, then user equipment 300 may increase the maximum number of frames F over which to average the cross-correlation signals $c_{m,p,f}[n]$. In this case, user equipment 300 may increase the maximum frame count F until a candidate synchronization signal $d_p[n]$ has a score that is greater than or equal to the thresholds. As described in relation to FIG. 6, the threshold may be a predetermined score, a fixed value, or a value that is dynamically updated with each iteration.

At 724, synchronization circuitry 330 selects a maximum cross-correlation score $S_p$ from the averaged cross-correlation scores. The average cross-correlation scores may be stored in an averaged cross-correlation score database (not shown) in memory 340. The maximum score is the score associated with the candidate synchronization signal $d_p[n]$ that is most likely being transmitted by base station 102. At 726, synchronization circuitry 330 selects a candidate synchronization signal $d_p[n]$ that corresponds to the maximum cross-correlation score, which may be stored in an averaged cross-correlation score database (not shown).

Eq. 8 evaluates a maximum amplitude value $\bar{c}_{max}$ of the average cross-correlation signal $\bar{c}_{m,p}[n]$. The maximum amplitude value $\bar{c}_{max}$ may be evaluated after the average cross-correlation signal is obtained and stored in memory 340. In another embodiment, user equipment 300 may store the maximum amplitude value in memory 340 without storing the associated average cross-correlation signal $\bar{c}_{m,p}[\tau]$ to reduce storage requirements.

$$\bar{c}_{max} = \max_{n=0,1,\ldots,N}[\bar{c}_{m,p}[n]] \qquad (8)$$

In some embodiments, synchronization circuitry 330 may evaluate a cross-correlation score $S_p$ for each average correlation signal $\bar{c}_{m,p}[n]$ at 722 immediately after each average correlation signal $\bar{c}_{m,p}[n]$ is obtained at 720 to avoid storing the average correlation signal $\bar{c}_{m,p}[n]$ in memory 340.

The systems and methods described in relation to FIGS. 1-7 address the issue of identifying synchronization signals in low signal-to-noise ratios and fading environments (e.g., when a user is traveling through an area where wireless signals are weak, such as a tunnel). Identification of synchronization signals in a transmitted radio signal 106 is important because the synchronization signals allow a user equipment 300 to set up initial access procedures an communicate with base station 102. These initial access procedures determine how the user equipment reads transmitted data in radio signals 106 from base station 102. Furthermore, identifying synchronization signals involves computationally expensive and time consuming processes, which drains the battery life of a mobile device. Processing signals in a frequency domain and converting the result to a time domain reduces the complexity of the computations and may speed up processing and increase battery life of a user equipment. In particular, the complexity is reduced because a smaller set of tones is used for multiplication in the frequency domain. A smaller set of tones may be used because the received synchronization signal in the frequency domain occupies only a subset of the tones that are available over a full bandwidth of tones. The tones that are not used within the full bandwidth of tones may be set to a value of zero. Furthermore, because the set of tones used during computations is reduced, only the required tones are used for computing the IFFT, which reduces the size of the IFFT and thus the complexity of the computational requirements.

Figure 8:
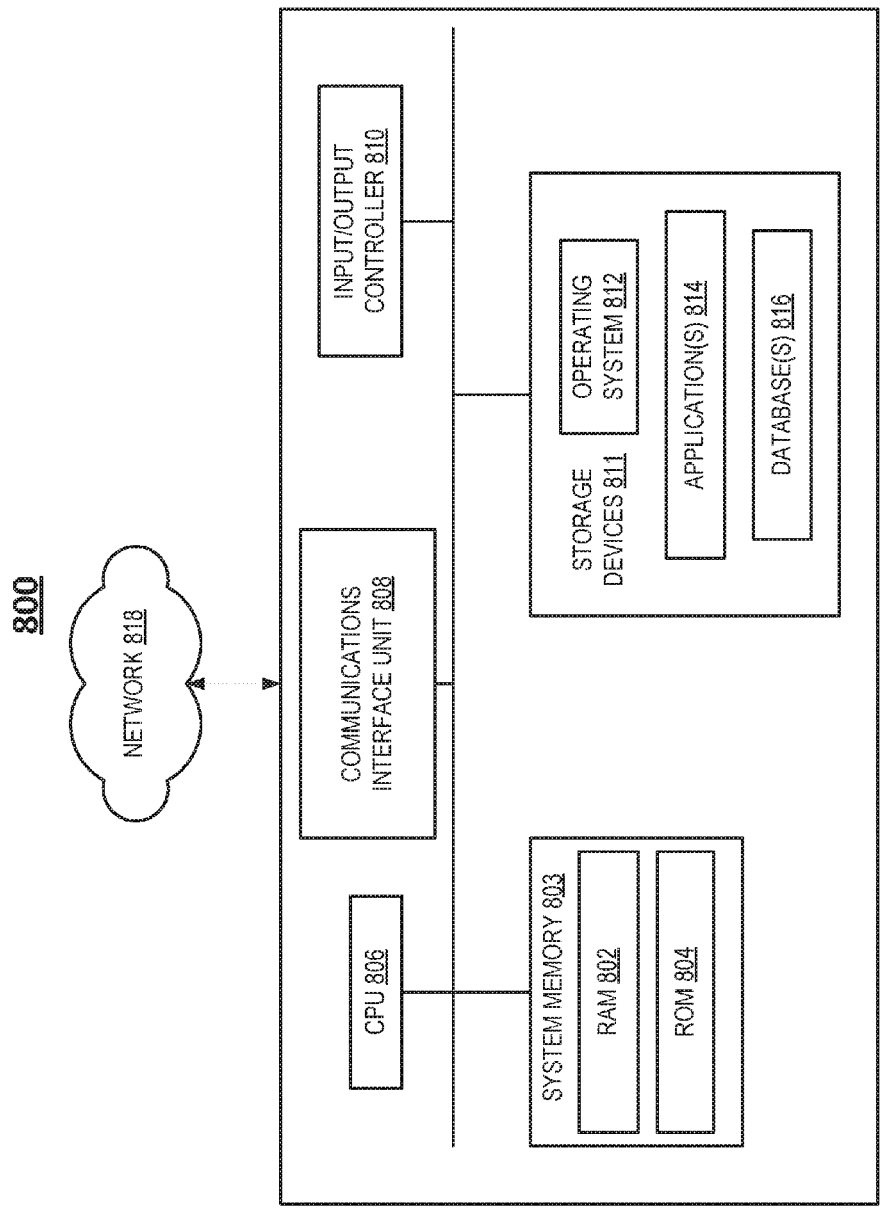
FIG. 8 shows a block diagram of a computing device, for performing any of the processes described herein, in accordance with an embodiment of the present disclosure.

FIG. 8 is a block diagram 800 of a computing device, such as any of the components of the system of FIG. 3, for performing any of the processes described herein, in accordance with an embodiment of the disclosure. Each of the components of these systems may be implemented on one or more computing devices 800. In certain aspects, a plurality of the components of these systems may be included within one computing device 800. In certain embodiments, a component and a storage device 811 may be implemented across several computing devices 800.

The computing device 800 comprises at least one communications interface unit 808, an input/output controller 810, system memory 803, and one or more data storage devices 811. The system memory 803 includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network 818 or local network, to other servers or systems.

The computing device 800 may be configured in a distributed architecture, wherein databases and processors are housed in separate units or locations. Some units perform primary processing functions and contain at a minimum a general controller or a processor and a system memory 803. In distributed architecture embodiments, each of these units may be attached via the communications interface unit 808 to a communications hub or port (not shown) that serves as a primary communication link with other servers, client or user computers and other related devices. The communications hub or port, may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device 811. The data storage device 811 may comprise an appropriate combination of magnetic, optical or semiconductor memory, and may include, for example, RAM 802, ROM 804, flash drive, an optical disc such as a compact disc or a hard disk or drive. The CPU 806 and the data storage device 811 each may be, for example, located entirely within a single computer or other computing device; or connected to each other by a communication medium, such as a USE port, serial port cable, a coaxial cable, an Ethernet cable, a telephone line, a radio frequency transceiver or other similar wireless or wired medium or combination of the foregoing. For example, the CPU 806 may be connected to the data storage device 811 via the communications interface unit 808. The CPU 806 may be configured to perform one or more particular processing functions.

The data storage device 811 may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device 811, such as from the ROM 804 or from the RAM 802. While execution of sequences of instructions in the program causes the CPU 806 to perform the process steps described herein, hard-wired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to decoding a codeword as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer may load the instructions into its dynamic memory and send the instructions over an Ethernet connection, cable line, or even telephone line using a modem. A communications device local to a computing device 800 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for detecting a received synchronization signal, the method comprising:
  receiving, at a receiver, a signal from a transmitter, wherein the signal includes the received synchronization signal;

processing, in frequency domain, the received signal and a plurality of candidate synchronization signals to obtain a frequency transform of at least one of a plurality of correlation signals, wherein the processing comprises multiplying a frequency transform of the received signal with a frequency transform of at least one of the plurality of candidate synchronization signals;

selecting, based at least in part on the at least one of the plurality of correlation signals, one of the plurality of candidate synchronization signals, wherein the selected candidate synchronization signal is correlated with the received synchronization signal; and detecting the received synchronization signal based at least in part on (i) the received signal, and (ii) a characteristic obtained from the at least one of the plurality of correlation signals that is associated with the selected candidate synchronization signal.

2. The method of claim 1, wherein the characteristic is a delay value.

3. The method of claim 2, wherein detecting the received synchronization signal further comprises shifting the received signal in time by the delay value to identify a start of the received synchronization signal.

4. The method of claim 1, further comprising assessing a correlation score for each of the plurality of correlation signals to obtain a plurality of correlation scores.

5. The method of claim 1, wherein the selected candidate synchronization signal is associated with a correlation score that exceeds a predetermined threshold.

6. The method of claim 1, wherein the characteristic is obtained by evaluating a time coordinate that corresponds to a maximum amplitude of the at least one of the plurality of correlation signals that is associated with the selected candidate synchronization signal.

7. The method of claim 1, wherein selecting the one of the plurality of candidate synchronization signals further comprises:
averaging the plurality of correlation signals over consecutive frames to obtain a plurality of average correlation signals;
assigning a correlation score for each of the plurality of average correlation signals; and
selecting the one of the plurality of candidate synchronization signals corresponding to an average correlation signal with a highest correlation score.

8. The method of claim 7, wherein the correlation score for each respective average correlation signal corresponds to a maximum amplitude in the respective average correlation signal.

9. The method of claim 1, wherein processing the received signal and the plurality of candidate synchronization signals to obtain the frequency transform of the at least one of the plurality of correlation signals further comprises computing a function in the frequency domain based on the received signal and at least one of the plurality of candidate synchronization signals.

10. A system for detecting a received synchronization signal, the system comprising control circuitry configured to:

receive, at a receiver, a signal from a transmitter, wherein the signal includes the received synchronization signal;

process, in frequency domain, the received signal and a plurality of candidate synchronization signals to obtain a frequency transform of at least one of a plurality of correlation signals by multiplying a frequency transform of the received signal with a frequency transform of at least one of the plurality of candidate synchronization signals;

select, based at least in part on the at least one of the plurality of correlation signals, one of the plurality of candidate synchronization signals, wherein the selected candidate synchronization signal is correlated with the received synchronization signal; and detect the received synchronization signal based at least in part in (i) the received signal, and (ii) a characteristic obtained from the at least one of the plurality of correlation signals that is associated with the selected candidate synchronization signal.

11. The system of claim 10, wherein the characteristic is a delay value.

12. The system of claim 11, wherein the control circuitry is further configured to detect the received synchronization signal by shifting the received signal in time by the delay value to identify a start of the received synchronization signal.

13. The system of claim 10, wherein the control circuitry is further configured to assess a correlation score for each of the plurality of correlation signals to obtain a plurality of correlation scores.

14. The system of claim 10, wherein the selected candidate synchronization signal is associated with a correlation score that exceeds a predetermined threshold.

15. The system of claim 10, wherein the characteristic is obtained by evaluating a time coordinate that corresponds to a maximum amplitude of the at least one of the plurality of correlation signals that is associated with the selected candidate synchronization signal.

16. The system of claim 10, wherein the control circuitry is further configured to select the one of the plurality of candidate synchronization signals by:
averaging the plurality of correlation signals over consecutive frames to obtain a plurality of average correlation signals;
assigning a correlation score for each of the plurality of average correlation signals; and
selecting the one of the plurality of candidate synchronization signals corresponding to an average correlation signal with a highest correlation score.

17. The system of claim 16, wherein the correlation score for each respective average correlation signal corresponds to a maximum amplitude in the respective average correlation signal.

18. The system of claim 10, wherein the control circuitry is further configured to process the received signal and the plurality of candidate synchronization signals to obtain the frequency transform of the at least one of the plurality of correlation signals by computing a function in the frequency domain based on the received signal and at least one of the plurality of candidate synchronization signals.

* * * * *